United States Patent [19]

Klie et al.

[11] 4,088,357
[45] May 9, 1978

[54] BUMPER FOR MOTOR VEHICLES

[75] Inventors: Wolfgang Klie, Korntal; Hubert Hutai, Grafenau; Wolfgang Fischer, Leinfelden, all of Germany

[73] Assignee: Daimler-Benz Aktiengesellschaft, Germany

[21] Appl. No.: 607,035

[22] Filed: Aug. 22, 1975

[30] Foreign Application Priority Data

Aug. 24, 1974 Germany .............................. 2440708

[51] Int. Cl.² .............................................. B60R 19/08
[52] U.S. Cl. ...................................................... 293/98
[58] Field of Search ..................................... 293/71, 98

[56] References Cited

U.S. PATENT DOCUMENTS

| | | | |
|---|---|---|---|
| 2,990,802 | 7/1961 | Ohg et al. | 293/71 R |
| 3,471,979 | 10/1969 | Herr et al. | 293/71 R |
| 3,574,379 | 4/1971 | Jordan | 293/71 R |
| 3,574,406 | 4/1971 | Wessells | 293/98 X |
| 3,583,756 | 6/1971 | Wilfert | 293/71 R X |
| 3,645,575 | 2/1972 | Slavney | 293/71 X |
| 3,666,310 | 1/1971 | Burgess | 293/71 R |
| 3,680,903 | 8/1972 | Hulten | 293/71 R |
| 3,782,767 | 1/1974 | Moore | 293/71 R |
| 3,866,963 | 2/1975 | Weller | 293/71 R X |
| 3,869,165 | 3/1975 | Miller | 293/71 R |
| 3,891,258 | 6/1975 | Barenyi | 293/98 |

Primary Examiner—Robert R. Song
Assistant Examiner—Norman L. Stack, Jr.
Attorney, Agent, or Firm—Craig & Antonelli

[57] ABSTRACT

A bumper for a motor vehicle in which an energy absorbing hollow synthetic plastic body member is connected with a bearer securely arranged at the vehicle frame; the bearer is thereby provided with anchoring portions that are directly, form-lockingly connected with the synthetic plastic body member, preferably are embedded therein.

31 Claims, 5 Drawing Figures

BUMPER FOR MOTOR VEHICLES

The present invention relates to a bumper for motor vehicles in which an energy-absorbing, hollow synthetic plastic body is connected with a bearer which is fixedly mounted at the vehicle frame or chassis.

It is known to so construct bumpers for motor vehicles that the kinetic energy of the motor vehicle is absorbed by the bumper in case of a front end impact with low velocity, without causing damages at the vehicle. Generally, a velocity of about 7 to 8 kilometers per hour is thereby predicated as the basis, up to which the requirement of the energy-absorption is assured whereby the bumper, after the impact, is to assume essentially again its old form. It is known that bumpers can fulfill these prerequisites if they are either provided with a bending resistance bearer in front of the energy absorbing part, or if they are provided with the bending-resistant bearer to the rear or behind the energy-absorbing part. This latter type of construction, with which the present invention concerns itself, generally provides that either fully foamed-out synthetic plastic hollow bodies or synthetic plastic hollow bodies provided with air chambers are fixedly mounted with the aid of several bolts or screws at a bearer rigidly mounted in the vehicle structure. This type of construction, however, entails the disadvantage that the manufacture of such a bumper requires a large expenditure for its assembly and that several operations are necessary for the manufacture of the bumper.

The present invention is therefore concerned with the task to enable for a bumper of the aforementioned type, in which the bearer is located behind the energy absorbing part, a manufacture in a single operation and therewith a considerable reduction of the manufacturing costs.

The present invention essentially consists in that the bearer is provided with anchoring parts which are directly embedded in the body of synthetic plastic material, for example, of suitable synthetic resinous material. It becomes possible by this construction to dispense with threaded connections so that the entire bumper is suitable especially for an economic large-series manufacture. In case of damage of the bearer as a result of excessively high impact velocities, the bearer can be exchanged as a whole together with the synthetic plastic member, if the bumper is mounted on the forward longitudinal bearers, for example, by means of bolts.

It is particularly advantageous if the anchoring parts are constructed as continuous profile parts of the bearer, which are provided with apertures, recesses or bent-off edges because in that case a good connection of synthetic plastic material and bearer parts is achieved which are generally made of sheet-metal material.

In bumpers in which the synthetic plastic bodies are provided with air chambers, it is appropriate to construct the anchoring parts as two separate sheet-metal profile members which are embedded in the upper and in the lower wall of the synthetic plastic body and can be welded together with further bearer parts to be mounted at the vehicle frame. This is so as in this manner after the manufacture of the synthetic plastic body by foaming-out, casting or molding, the core can be removed and it becomes possible subsequently in a very simple manner to spot-weld the sheet-metal profile members serving as anchoring parts at the other bearer parts. The sheet-metal profile members may thereby form the upper and lower wall of a hollow bearer composed of sheet-metal profile members whereby the sheet-metal profile members embedded in the synthetic plastic body extend approximately parallel to one another in order that the core can be pulled out after the manufacture of the synthetic plastic body. The free edge portions of the sheet-metal profile members may be provided with connecting flanges for the remaining sheet-metal profile members. It becomes very readily possible in this manner to connect the sheet-metal profile members with one another by the use of spot-welding.

It is not possible with the bumper constructions so far described to utilize a closed extruded profile as bearer, which as such would enable a still further manufacturing simplification. The use of such a closed extruded profile is not possible because the core necessary for the manufacture of the synthetic plastic body has to be pulled out subsequently. It is therefore advantageous if the interior space of the hollow synthetic plastic body is filled out with at least one filler body serving as core for the manufacture of the synthetic plastic body which is connected with the bearer or with a part thereof and also remains subsequently within the synthetic plastic body. As a result of this construction, already completely manufactured extruded profiles can be used as bearers and the spot-welding of sheet-metal parts can be dispensed with.

The filler body may also be a body of synthetic resinous material which is molded onto the bearer or parts thereof or is adhesively connected thereto. This filler body offers the advantage that it can also be inserted or used as energy-absorber and thereby assists in its effect the outer synthetic plastic body which, as a rule, is constructed as hard-elastic shell. The bearer may be constructed in this embodiment as extruded profile member, at which the filler member is seated within retaining grooves. However, it is also possible to make the bearer of assembled sheet-metal profile members which are provided on the outside of the filler member on both sides with the anchoring portions constructed as sheet-metal profiles. The construction with an inner filler member offers the advantage that a saving in weight and volume is possible, for example, by the use of extruded aluminum profiles. It can also be expected by the use of two different materials that the known temperature dependence of force-distance-characteristics of synthetic plastic bumpers can be reduced. Finally, it is possible to taper the bearer cross section in the direction toward the radiator so that the inflow of the cooling air can be improved.

Accordingly, it is an object of the present invention to provide a bumper for motor vehicles which avoids by simple means the aforementioned shortcomings and drawbacks encountered in the prior art.

Another object of the present invention resides in a bumper for motor vehicles which is characterized by relatively slight assembly costs, enabling also a relatively simple manufacture thereof.

A further object of the present invention resides in a bumper for motor vehicles in which the manufacture thereof is possible in a single operation, thereby entailing considerable manufacturing cost reductions.

Still a further object of the present invention resides in a bumper of the type described above in which threaded connections can be dispensed with, thereby rendering the bumper suitable in particular for mass production.

Another object of the present invention resides in a bumper for motor vehicles in which the parts can be readily interchanged in case of damage while avoiding spot-welded connections.

A still further object of the present invention resides in a synthetic plastic bumper for motor vehicles in which savings as regards space and volume are possible while at the same time the temperature dependence of the force-path-characteristics can be improved.

These and further objects, features and advantages of the present invention will become more apparent from the following description when taken in connection with the accompanying drawing which shows, for purposes of illustration only, several embodiments in accordance with the present invention and wherein.

Figure 4:
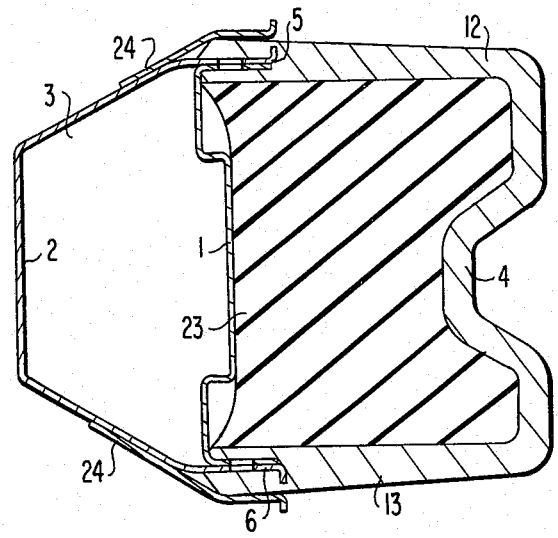
Figure 5:
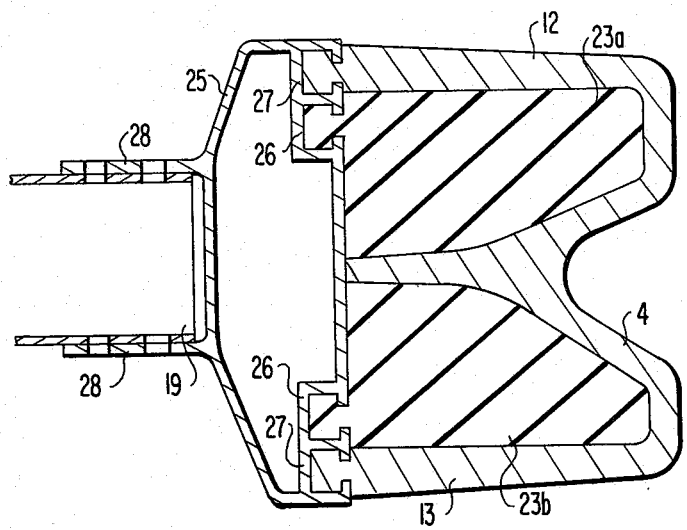

FIG. 4 is a cross sectional view through still another embodiment of a bumper in accordance with the present invention, in which a filler body is arranged on the inside of synthetic plastic body, which is connected with the bearer prior to the manufacture of the outer synthetic plastic body and subsequently remains within this synthetic plastic body; and FIG. 5 is a cross sectional view of still a further modified embodiment of a bumper in accordance with the present invention, similar to FIG. 4, however, with a different outer synthetic plastic body and with an extruded aluminum profile member as a bearer.

Figure 1:
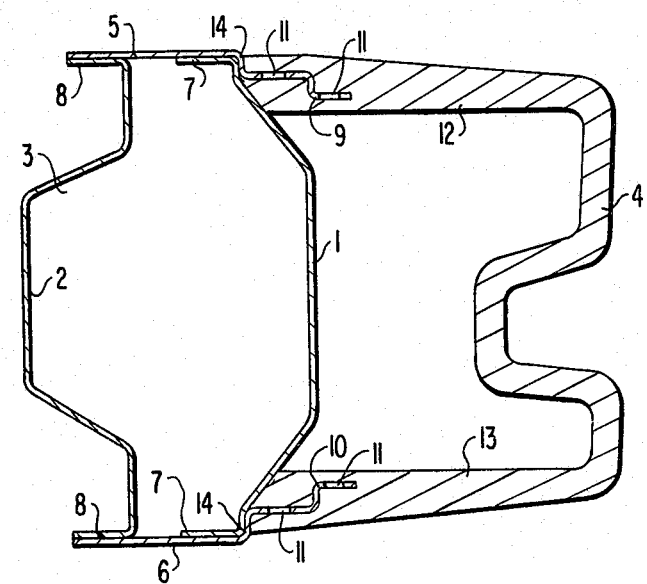
FIG. 1 is a cross sectional view through a bumper according to the present invention having an outer synthetic plastic hollow body provided with air chambers.

Referring now to the drawing wherein like reference numerals are used throughout the various views to designate like parts and more particularly to FIG. 1, a bearer for a hollow synthetic plastic body member 4, which is formed of a forward sheet-metal profile member 1 and of a rear sheet-metal profile member 2, is illustrated in this figure whose upper and lower walls 5 and 6 are also formed by sheet-metal profile members which are spot-welded to the flange portions 7 and 8 of the sheet-metal profile members 1 and 2 and are provided with profile portions 9 and 10 extending beyond the forward sheet-metal profile member 1, which serve as anchoring parts for the synthetic plastic body member 4. Apertures or openings 11 are provided in these profile portions 9 and 10 which are intended to serve for purposes of a good connection of the synthetic resinous material with the sheet-metal material. Additionally, the sheet-metal profile portions 9 and 10 serving as anchoring parts are angularly bent off in order also to improve the fastening of the synthetic plastic body member 4 at the bearer 3.

The bumper profile illustrated in FIG. 1 which together with the bearer 3 is arranged in a manner not illustrated in detail at the frame of a motor vehicle, preferably at the forward end of the longitudinal bearers, is manufactured in the following manner;

The two sheet-metal profile members 5 and 6 are secured at a core for the manufacture of the synthetic plastic body member 4 and after the emplacement of the outer form or mold half, the synthetic plastic body 4 is either cast or foamed-out and thereby embeds the profile portions 9 and 10 in its upper wall 12 and its lower wall 13, respectively. The outer form or mold half and the core are then removed and the sheet-metal profile portions 1 and 2 are spot-welded to the sheet-metal profile members 5 and 6 with the aid of the flanges 7 and 8. Since the sheet metal profile members 1 are able to abut at the angularly bent offsets or shoulders of the profile members 9 and 10, a complicated alignment operation can be dispensed with. The same is true of the sheet-metal profile members 2 whose flanges 8 align and are flush with the edges of the sheet-metal profile members 5 and 6. The manufacture of the bumper illustrated in FIG. 1 is thereby possible without threaded connection.

Figure 2:
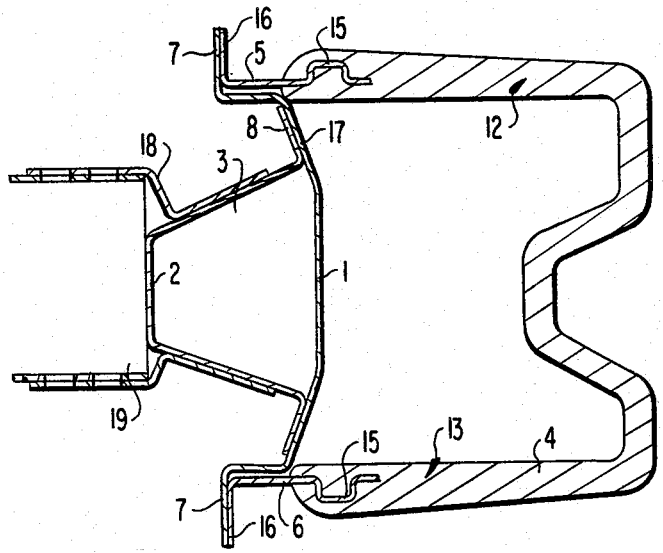
FIG. 2 is a cross sectional view through a modified embodiment of a bumper in accordance with the present invention, similar to FIG. 1, in which however the anchoring parts for the synthetic plastic body member and the bearer itself are constructed in a different manner.

The manufacture of the bumper profile of FIG. 2 takes place in a similar manner, whereby in that case the sheet-metal profile members 5 and 6 are not securely connected with the synthetic plastic body member 4 by means of holes or apertures but only by way of the angularly bent hat-shaped portions 5. Different from the embodiment of FIG. 1 is in this case that also sheet-metal profile members 5 and 6 are provided with connecting flanges 16 which are connected with the connecting flanges 7 of the profile member 1. The profile member 2 abuts in this case with its connecting flanges 8 at the inclined surfaces 17 of the profile member 1 which are matched to the inner contour of the synthetic plastic body member 4. The fastening of the entire bearer 3 to the synthetic plastic body member 4 takes place by way of straps or bars 18 spot-welded with the area of the outer ends, which are connected with the ends 19 of the vehicle longitudinal bearers.

Figure 3:
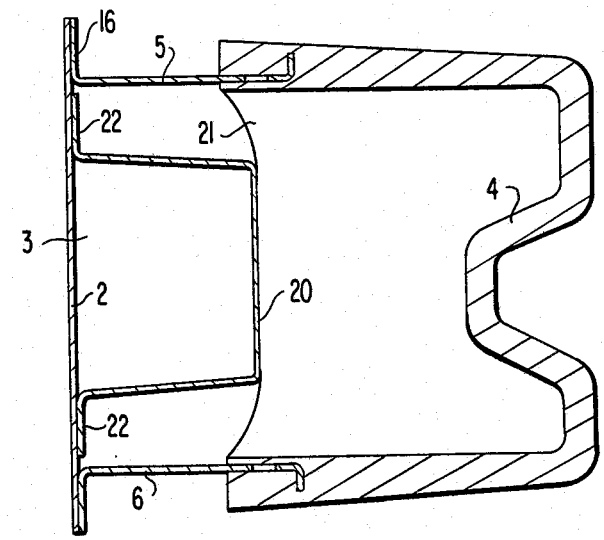
FIG. 3 is a cross sectional view through a still further modified embodiment of a bumper in accordance with the present invention, similar to FIG. 1 but with a modified construction of the bearer profile.

Also FIG. 3 illustrates a synthetic plastic body profile which is filled on the inside thereof with air, but which differeing from the profiles of FIGS. 1 and 2, is not closed off on the inside thereof by a profile member 1. Instead, with this profile, a profile member 20 is supported only at the vertical ribs 21 of the synthetic plastic body member 4 and is connected with the outer profile member 2 constructed as straight sheet-metal member by way of flanges 22. The profile members 5 and 6 thus do not form in that case the upper and lower wall of the bearer assembled of the profile members 22, but they represent in that case exclusively the anchoring parts for the synthetic plastic body member 4 which is spot-welded at the portion of the sheet metal plate 2 projecting beyond the flange 22 by means of these anchoring parts 5 and 6 and with the aid of the flanges 16. Also, in this embodiment the sheet-metal profile members 5 and 6 embedded in the synthetic plastic body member 4 extend approximately parallel to one another so that the core necessary for the manufacture of the synthetic plastic body member 4 can be readily removed after the manufacture thereof. The entire bumper is then manufactured by spot-welding to the flat sheet metal member 2 provided with the sheet metal profile 20.

In all embodiments described so far the synthetic plastic body profile 4 of suitable synthetic plastic material is provided with air chambers and in all cases it is necessary to subsequently remove again the core necessary for the manufacture of the synthetic plastic body member 4. It is therefore necessary to connect the sheet metal profile members 5 and 6 serving as anchoring parts with the bearer only subsequently by spot-welding. This expenditure can be avoided if according to FIG. 4 a filler member 23 is inserted into the synthetic plastic body member which is connected with the plastic profile member 4. With this construction it therefore becomes possible to assemble the entire bearer 3 prior to the manufacture of the synthetic plastic body member 4 because the filler body 23 can serve as core for the manufacture of the synthetic plastic body member 4 which after manufacture remains on the inside of the synthetic plastic body member 4. The anchoring portions 5 and 6 are arranged in that case on both sides on the outside of the filler body 23 so that after the synthetic plastic body member 4 is foamed out or molded or cast-in, they are embedded in the upper and lower wall 12 and 13 of the synthetic plastic body member 4. Closure members 24 may subsequently serve the purpose of an aesthetic appearance of the edge of the bumper.

In order to save also the expenditure for the manufacture of the bearer made of sheet-metal profile members, provision may be made according to FIG. 5 to mount the filler body portions 23a and 23b prior to the manufacture of the synthetic plastic body member 4 on an extruded aluminum profile member 25 which can take place in a simple manner in that these filler body members 23a and 23b are foamed-in, cast-in, or molded-in into the retaining grooves 26 of the aluminum profile 25. With this embodiment as also with the embodiment according to FIG. 4 the filler body members 23a, 23b and 23 are made of synthetic resinous material of any suitable type, for example, of polyurethane foam and also in the embodiment of FIG. 5, these filler body members 23a and 23b remain inside of the synthetic plastic body member 4 which is constructed as a hard-elastic shell of any suitable known synthetic resinous material. In order to enable the mounting of the synthetic resinous body member 4 at the extruded profile member 25, further retaining grooves 27 are provided outside the retaining grooves 26, into which are rigidly inserted the upper wall 12 and the lower wall 13 of the synthetic plastic body member 4 during the manufacturing operation. The aluminum profile member 25 can then be connected by way of the attached lugs or straps 28 with the ends 19 of the vehicle longitudinal bearers by the use of bolts. In the embodiment according to FIG. 5, no separate expenditure for the manufacture of a bearer composed of sheet-metal profile members is thus necessary and also no additional operations are required for the assembly of the bumper.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A composite bumper structure for vehicles comprising in combination
   an impact force absorbing body means formed of an synthetic plastic material, said body means being configured with an endwall and a plurality of sidewalls defining a hollow cavity open at one end and closed at another, said sidewalls extending in planes approximately transverse with respect to the plane of the closed end, and
   bearer means securely arranged on relatively fixed vehicle parts for holding said hollow body means, said bearer means including anchoring means, plural sidewalls of said body means being formed integrally about portions of said anchoring means for connecting said body means and said bearer means into a unitary structure, and said anchor means being configured so as not to extend inwardly across the planes of said sidewalls thereby leaving access to the entire cavity through said open end unobstructed.

2. A bumper structure according to claim 1, wherein said anchoring means include two separate sheet-metal flange members which are embedded respectively in an upper and a lower wall of said hollow body means.

3. A bumper structure according to claim 2, wherein said two separate sheet-metal flange members embedded in said walls of said hollow body means extend approximately parallel to one another.

4. A bumper structure according to claim 3, wherein said two separate sheet-metal flange members are spaced from one another at a distance sufficient to accommodate removal of a molding core for said hollow body means.

5. A bumper structure according to claim 4, wherein said two separate sheet-metal flange members form the upper and lower walls of said bearer means forming a hollow bearer member constructed of sheet-metal members.

6. A bumper structure according to claim 1, wherein said anchoring means includes anchoring portions directly embedded in respective walls of said hollow body means.

7. A bumper structure according to claim 6, wherein said anchoring portions are constructed as configured flange members of said bearer means.

8. A bumper structure according to claim 7, wherein said configured flange members are provided with apertures.

9. A bumper structure according to claim 8, wherein said configured flange members are provided with recesses.

10. A bumper structure according to claim 8, wherein said configured flange members are provided with angularly bent portions.

11. A bumper structure according to claim 8, wherein said anchoring portions are constructed as two separate sheet-metal flange members which are embedded respectively in an upper and a lower wall of the synthetic plastic hollow body means, said two flange members being welded together with further bearer portions adapted to be mounted at the fixed vehicle part.

12. A bumper structure according to claim 11, wherein said two separate sheet-metal flange members form the upper and lower walls of said bearer means forming a hollow bearer member constructed of sheet-metal members.

13. A bumper structure according to claim 12, wherein said two separate sheet-metal flange members embedded in the synthetic plastic hollow body means extend approximately parallel to one another.

14. A bumper structure according to claim 12, wherein said two separate sheet-metal flange members have free edge portions which are provided with connecting flanges for connection with other sheet-metal members.

15. A bumper structure according to claim 1, wherein said hollow body means formed of synthetic plastic material is integrally molded about said anchoring means.

16. A composite bumper structure for vehicles comprising in combination.

an impact force absorbing means formed of a synthetic plastic material, said body means being configured with an endwall and a plurality of sidewalls defining a cavity open at one end, said endwall and sidewalls being molded about a filler body member which fills said cavity;

bearer means securely arranged at relatively fixed vehicle parts for holding said body means, said bearer means including anchoring means, said body means being formed integrally about portions of said anchor means so as to connect said body means to said bearer means as a unitary structure with said filler body retained within said cavity by said anchoring means.

17. A composite bumper structure according to claim 16, wherein exposed portions of said anchor means extend over at least part of said open end in contact with said filler body member.

18. A bumper structure according to claim 16, wherein said filler body member is connected with at least a part of said bearer means.

19. A bumper structure according to claim 16, wherein said filler body member is connected with the bearer means.

20. A bumper structure according to claim 16, wherein said filler body member is made of synthetic resinous material.

21. A bumper structure according to claim 20, wherein said synthetic resinous filler body member is molded onto at least a part of said bearer means.

22. A bumper structure according to claim 20, wherein said synthetic resinous filler body member is adhesively bonded to said bearer means.

23. A bumper structure according to claim 20, wherein said bearer means is assembled of sheet-metal members, and is provided at both sides outside of the filler body member with said anchoring portions.

24. A bumper structure according to claim 20, wherein said bearer means includes a closed extruded member having retaining groove means, said filler body member being seated in said retaining groove means.

25. A bumper structure according to claim 24, wherein said extruded member is provided, outside of said retaining groove means, with second retaining groove means serving as said anchoring portions for said synthetic resinous hollow body means.

26. A bumper structure according to claim 16, wherein said filler body member is connected with at least a part of said bearer means.

27. A bumper structure according to claim 16, wherein said filler body member is made of synthetic resinous material molded onto at least a part of said bearer means.

28. A bumper structure according to claim 16, wherein said filler body member is adhesively bonded to said bearer means.

29. A bumper structure according to claim 16, wherein said bearer means is assembled of sheet-metal members, and is provided at both sides outside of the filler body member with said anchoring means.

30. A bumper structure according to claim 16, wherein said bearer means includes a closed extruded member having retaining groove means, said filler body member being seated in said retaining groove means.

31. A bumper structure according to claim 30, wherein said extruded member is provided, outside of said retaining groove means, with second retaining groove means serving as said anchoring means for said synthetic resinous hollow body means.

* * * * *